US012592242B2

(12) United States Patent
Shah et al.

(10) Patent No.: US 12,592,242 B2
(45) Date of Patent: Mar. 31, 2026

(54) MACHINE LEARNING (ML) BASED EMOTION, IDENTITY AND VOICE CONVERSION IN AUDIO USING VIRTUAL DOMAIN MIXING AND FAKE PAIR-MASKING

(71) Applicant: SONY GROUP CORPORATION, Tokyo (JP)

(72) Inventors: Nirmesh Shah, Bengaluru (IN); Mayank Kumar Singh, Bengaluru (IN); Naoya Takahashi, Bengaluru (IN); Naoyuki Onoe, Bengaluru (IN)

(73) Assignee: SONY GROUP CORPORATION, Tokyo (JP)

( * ) Notice: Subject to any disclaimer, the term of this patent is extended or adjusted under 35 U.S.C. 154(b) by 303 days.

(21) Appl. No.: 18/475,788

(22) Filed: Sep. 27, 2023

(65) Prior Publication Data

US 2024/0185874 A1 Jun. 6, 2024

Related U.S. Application Data

(60) Provisional application No. 63/380,425, filed on Oct. 21, 2022.

(51) Int. Cl.
*G10L 21/013* (2013.01)
*G10L 13/02* (2013.01)
(Continued)

(52) U.S. Cl.
CPC ............ *G10L 21/013* (2013.01); *G10L 25/63* (2013.01); *G10L 13/02* (2013.01); *G10L 13/04* (2013.01); *G10L 2021/0135* (2013.01)

(58) Field of Classification Search
CPC ...................... G10L 21/013; G10L 2021/0135
See application file for complete search history.

(56) References Cited

U.S. PATENT DOCUMENTS 11,037,573 B2 * 6/2021 Arantes .................... G06F 3/167

FOREIGN PATENT DOCUMENTS

| | | | | |
|---|---|---|---|---|
| CN | 111883149 B | | 2/2022 | |
| CN | 114299917 A | | 4/2022 | |
| WO | WO 2022/237665 | * | 5/2022 | ............ G10L 13/02 |

OTHER PUBLICATIONS

Shah, et al., "Nonparallel Emotional Voice Conversion for Unseen Speaker-Emotion Pairs Using Dual Domain Classifiers And Virtual Domain Mixing Training", Feb. 31, 2023, 05 pages.

(Continued)

*Primary Examiner* — Farzad Kazeminezhad
(74) *Attorney, Agent, or Firm* — CHIP LAW GROUP

(57) ABSTRACT

An electronic device and method for machine learning (ML) based emotion and voice conversion in audio using virtual domain mixing and fake pair-masking is disclosed. The electronic device receives a source audio associated with a first user, a reference-speaker audio associated with a second user, and a reference-emotion audio associated with a third user. The electronic device applies a set of ML models to generate a converted audio. The generated converted audio is associated with content of the source audio, an identity of the second user and an emotion of the third user. The electronic device applies each of a source speaker classifier and a source emotion classifier on the converted audio, and re-trains an adversarial model. Based on the re-training, the adversarial model may allow conversion of an input audio to an output audio associated with the identity of the second user and the emotion of the third user.

20 Claims, 7 Drawing Sheets

(51) Int. Cl.

| | |
|---|---|
| ***G10L 13/04*** | (2013.01) |
| ***G10L 17/22*** | (2013.01) |
| ***G10L 25/63*** | (2013.01) |

(56) References Cited

OTHER PUBLICATIONS

Jian Ma et al: "Subband-based Generative Adversarial Network for Non-parallel Many-to-many Voice Conversion", arxiv.org, Cornell University Library, 201 Olin Library Cornell University Ithaca, NY 14853, Jul. 13, 2022 (Jul. 13, 2022), XP091270217.

Kun Zhou et al "Seen and Unseen emotional style transfer for voice conversion with a new emotional speech dataset", arxiv.org, Cornell University Library, 201 Olin Library Cornell University Ithaca, NY 14853, Oct. 28, 2020 (Oct. 28, 2020), XP081802758.

Shah Nirmesh et al: "Nonparallel Emotional Voice Conversion for Unseen Speaker-Emotion Pairs Using Dual Domain Adversarial Network & Virtual Domain Pairing", ICASSP 2023—2023 IEEE International Conference on Acoustics, Speech and Signal Processing (ICASSP), IEEE, Jun. 4, 2023 (Jun. 4, 2023), pp. 1-5, XP034451025, DOI: 10.1109/ICASSP49357.2023.10095842.

Yinghao Aaron Li et al: "StarGANv2-VC: A Diverse, Unsupervised, Non-parallel Framework for Natural-Sounding Voice Conversion", arxiv.org, Cornell University Library, 201 Olin Library Cornell University Ithaca, NY 14853, Jul. 21, 2021 (Jul. 21, 2021), XP091015430.

* cited by examiner

MACHINE LEARNING (ML) BASED EMOTION, IDENTITY AND VOICE CONVERSION IN AUDIO USING VIRTUAL DOMAIN MIXING AND FAKE PAIR-MASKING

CROSS-REFERENCE TO RELATED APPLICATIONS/INCORPORATION BY REFERENCE

This Application also makes reference to U.S. Provisional Application Ser. No. 63/380,425, which was filed on Oct. 21, 2022. The above stated Patent Applications are hereby incorporated herein by reference in their entirety

FIELD

Various embodiments of the disclosure relate to machine learning-based media processing. More specifically, various embodiments of the disclosure relate to machine learning (ML) based emotion and voice conversion in audio using virtual domain mixing and fake pair-masking.

BACKGROUND

Advancements in the field of machine learning (ML)-based speech translation systems have led to development of various ML models that have capability to perform emotional voice conversions. Emotional voice conversions may involve reception of a first audio associated with a first emotion style and a second audio associated with a second emotion style, and subsequent conversion of the first audio into a third audio. The conversion may be such that linguistic content of the first audio is preserved in the third audio and the first emotional style is transformed into the second emotion style. Conventional emotional voice conversion techniques may focus on speaker-dependent scenarios whereby emotion style of voice associated with a speaker may be altered. An ML model, trained on an emotional voice conversion task, on reception of an input voice signal associated with a speaker, may generate an output voice signal. The output voice signal may be such that a speaker identity or an emotion style associated with the input voice signal may be converted to a target speaker identity or a target emotion style. Such conversions may necessitate training or testing the ML model with emotional voice data associated with the target speaker. However, collection of emotional voice data associated with target speakers may be expensive and time-consuming, and, in some scenarios, may not be feasible.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for machine learning (ML) based emotion and voice conversion in audio using virtual domain mixing and fake pair-masking, is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
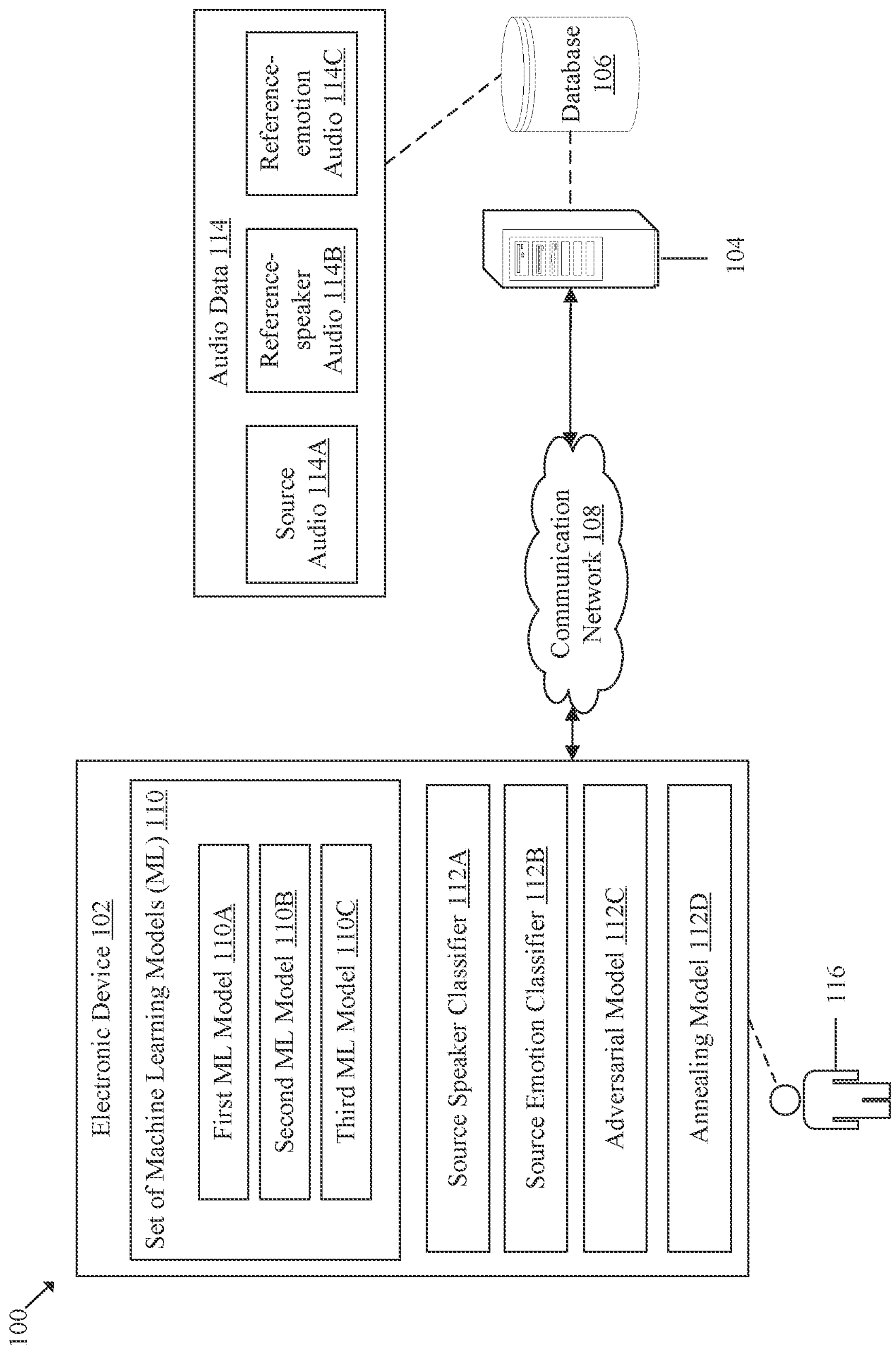
FIG. 1 is a block diagram that illustrates an exemplary network environment for machine learning (ML)-based emotion and voice conversion in audio using virtual domain mixing and fake pair-masking, in accordance with an embodiment of the disclosure.

The following described implementation may be found in an electronic device and method for machine learning (ML) based emotion and voice conversion in audio using virtual domain mixing and fake pair-masking. Exemplary aspects of the disclosure may provide an electronic device that may receive a source audio (for example, a voice with neutral emotion) associated with a first user (i.e., a source speaker). The electronic device may receive a reference-speaker audio (for example, a voice indicative of an identity of a target speaker) associated with a second user (i.e., the target speaker). The electronic device may receive a reference-emotion audio (for example, a voice with non-neutral target emotion) associated with a third user (who may be the target speaker or another speaker). The electronic device may apply a set of machine learning (ML) models on the received source audio, the received reference-speaker audio, and the received reference-emotion audio. The electronic device may generate a converted audio based on the application of the set of ML models. The generated converted audio may be associated with content of the source audio (i.e., linguistic content of the voice of the first user or the source speaker) an identity of the second user (i.e., the target speaker) and an emotion (i.e., the target emotion) of the third user. The electronic device may apply each of a source speaker classifier and a source emotion classifier on the generated converted audio. The electronic device may re-train an adversarial model based on the application of each of the source speaker classifier and the source emotion classifier. Based on the re-training of the adversarial model, an input audio (such as an input voice with a neutral emotion) associated with the first user may be converted to an output audio (such as an output voice) associated with the identity of the second user and the emotion of the third user.

It may be appreciated that an emotional voice conversion (EVC) system may convert an emotion associated with an input speech signal from one emotion style to another emotion style without modification of linguistic content of the input speech signal. However, such emotion conversions may be generally only possible for seen speaker-emotion combinations. That is, the EVC system may convert a current emotion style of the audio signal, which may be associated with a target speaker, to a target emotional style, based on availability of emotional data and neutral data associated with the target speaker during a training of the EVC system. Collection of emotional data along with the neutral data for the target speaker may be expensive, time-consuming, and, in some scenarios, may not be possible.

In order to address the aforesaid issues, the disclosed electronic device and method may employ ML-based emotion and voice conversion in audio using virtual domain mixing and fake pair-masking. The disclosed electronic device may apply a set of ML models on audio signals for conversion of emotion and/or voice associated with speakers of the audio signals. The conversion may be achieved even if emotional data associated with the speaker is not included in training data or test data, which may be used for training or testing the set of ML models. That is, the disclosed electronic device may use the set of ML models for emotion and voice conversion of unseen speaker-emotion combinations. The voice-emotion conversion may be achieved based on emotional data associated with supporting speakers. In some embodiments, the disclosed electronic device may further convert a speaker identity and a speaking style simultaneously. For such simultaneous conversions, a first ML model may be used for determination of a speaker style associated with a reference-speaker audio and a second ML model may be used for determination of an emotion style associated with a reference-emotion audio. Furthermore, the disclosed electronic device may use a virtual domain mixing (VDM) for random generation of combinations of speaker-emotion pairs based on the emotional data associated with supporting speakers. In disclosed electronic device may employ a fake-pair masking strategy to prevent a discriminator model from getting overfitted due to usage of the randomly generated speaker-emotion pairs for training an adversarial model.

FIG. 1 is a block diagram that illustrates an exemplary network environment for machine learning (ML)-based emotion and voice conversion in audio using virtual domain mixing and fake pair-masking, in accordance with an embodiment of the disclosure. With reference to FIG. 1, there is shown a network environment 100. The network environment 100 may include an electronic device 102, a server 104, and a database 106. The electronic device 102 may communicate with the server 104 through one or more networks (such as, a communication network 108). The electronic device 102 may include a set of ML models 110, a source speaker classifier 112A, a source emotion classifier 112B, an adversarial model 112C, and an annealing model 112D. The set of ML models 110 may include a first ML model 110A, a second ML model 110B, and a third ML model 110C. The database 106 may include audio data 114. The audio data 114 may include a source audio 114A, a reference-speaker audio 114B, and a reference-emotion audio 114C. There is further shown, in FIG. 1, a user 116 associated with the electronic device 102.

The electronic device 102 may include suitable logic, circuitry, interfaces, and/or code that may be configured to receive the source audio 114A associated with a first user. The electronic device 102 may receive the reference-speaker audio 114B associated with a second user. The electronic device 102 may receive the reference-emotion audio 114C associated with a third user. The electronic device 102 may apply the set of ML models 110 on the received source audio 114A, the received reference-speaker audio 114B, and the received reference-emotion audio 114C. The electronic device 102 may generate a converted audio based on the application of the set of ML models 110. The generated converted audio may be associated with content of the source audio 114A, an identity of the second user, and an emotion of the third user. The electronic device 102 may apply each of the source speaker classifier 112A and the source emotion classifier 112B on the generated converted audio. The electronic device 102 may re-train the adversarial model 112C based on the application of each of the source speaker classifier 112A and the source emotion classifier 112B. Based on the re-training, an input audio associated with the first user may be converted to an output audio associated with the identity of the second user and the emotion of the third user.

Examples of the electronic device 102 may include, but are not limited to, a computing device, a smartphone, a cellular phone, a mobile phone, a gaming device, a mainframe machine, a server, a computer workstation, a machine learning device (enabled with or hosting, for example, a computing resource, a memory resource, and a networking resource), and/or a consumer electronic (CE) device.

The server 104 may include suitable logic, circuitry, and interfaces, and/or code that may be configured to receive the source audio 114A, the reference-speaker audio 114B, and the reference-emotion audio 114C from the electronic device 102. The server 104 may include the set of ML models 110, and based on an application of the set of ML models 110 on each of the received source audio 114A, the received reference-speaker audio 114B, and the received reference-emotion audio 114C, the converted audio may be generated. The generated converted audio may be associated with the content of the source audio 114A, the identity of the second user, and the emotion of the third user. The server 104 may further include each of the source speaker classifier 112A and the source emotion classifier 112B, which may be applied on the generated converted audio for re-training of the adversarial model 112C based on the application of each of the source speaker classifier and the source emotion classifier (which may be included in the server 104). The re-trained adversarial model 112C may facilitate conversion of an input audio, received from the electronic device 102, to an output audio associated with the identity of the second user and the emotion of the third user. The server 104 may transmit the output audio to the electronic device 102.

The server 104 may be implemented as a cloud server and may execute operations through web applications, cloud applications, HTTP requests, repository operations, file transfer, and the like. Other example implementations of the server 104 may include, but are not limited to, a database server, a file server, a web server, a media server, an application server, a mainframe server, a machine learning server (enabled with or hosting, for example, a computing resource, a memory resource, and a networking resource), or a cloud computing server.

In at least one embodiment, the server 104 may be implemented as a plurality of distributed cloud-based resources by use of several technologies that are well known to those ordinarily skilled in the art. A person with ordinary skill in the art will understand that the scope of the disclosure may not be limited to the implementation of the server 104 and the electronic device 102, as two separate entities. In certain embodiments, the functionalities of the server 104 can be incorporated in its entirety or at least partially in the electronic device 102 without a departure from the scope of the disclosure. In certain embodiments, the server 104 may host the database 106. Alternatively, the server 104 may be separate from the database 106 and may be communicatively coupled to the database 106.

The database 106 may include suitable logic, interfaces, and/or code that may be configured to store the audio data 114. The database 106 may be derived from data off a relational or non-relational database, or a set of comma-separated values (csv) files in conventional or big-data storage. The database 106 may be stored or cached on a device, such as, a server (e.g., the server 104) or the electronic device 102. The device storing the database 106 may be configured to receive a query for the audio data 114 from the electronic device 102. In response, the device of the database 106 may be configured to retrieve and provide the audio data 114 to the electronic device 102, based on the received query.

In some embodiments, the database 106 may be hosted on a plurality of servers stored at the same or different locations. The operations of the database 106 may be executed using hardware including a processor, a microprocessor (e.g., to perform or control performance of one or more operations), a field-programmable gate array (FPGA), or an application-specific integrated circuit (ASIC). In some other instances, the database 106 may be implemented using software.

The communication network 108 may include a communication medium through which the electronic device 102 and the server 104 may communicate with each another. The communication network 108 may be one of a wired connection or a wireless connection. Examples of the communication network 108 may include, but are not limited to, the Internet, a cloud network, Cellular or Wireless Mobile Network (such as Long-Term Evolution and 5$^{th}$ Generation (5G) New Radio (NR)), satellite communication system (using, for example, a network of low earth orbit satellites), a Wireless Fidelity (Wi-Fi) network, a Personal Area Network (PAN), a Local Area Network (LAN), or a Metropolitan Area Network (MAN). Various devices in the network environment 100 may be configured to connect to the communication network 108 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The first ML model 110A may be a classifier model which may be trained to identify a relationship between inputs, such as features in a training dataset and output labels. The first ML model 110A may be applied on the received reference-speaker audio 114B and a first domain code associated with the received reference-speaker audio 114B. Based on the application of the first ML model 110A, a speaker style code associated with the received reference-speaker audio 114B may be obtained. The first ML model 110A may be defined by its hyper-parameters, for example, number of weights, cost function, input size, number of layers, and the like. The parameters of the first ML model 110A may be tuned and weights may be updated so as to move towards a global minima of a cost function for the first ML model 110A. After several epochs of the training on the feature information in the training dataset, the first ML model 110A may be trained to output a prediction/classification result for a set of inputs.

The first ML model 110A may include electronic data, which may be implemented as, for example, a software component of an application executable on the electronic device 102. The first ML model 110A may rely on libraries, external scripts, or other logic/instructions for execution by a processing device. The first ML model 110A may include code and routines configured to enable a computing device to perform one or more operations, such as, determination of the speaker style code. Additionally, or alternatively, the first ML model 110A may be implemented using hardware including a processor, a microprocessor (e.g., to perform or control performance of one or more operations), a field-programmable gate array (FPGA), or an application-specific integrated circuit (ASIC). Alternatively, in some embodiments, the first ML model 110A may be implemented using a combination of hardware and software.

In an embodiment, the first ML model 110A may be a neural network (NN) model. The NN model may be a computational network or a system of artificial neurons, arranged in a set of NN layers, as nodes. The set of NN layers of the NN model may include an input NN layer, one or more hidden NN layers, and an output NN layer. Each layer of the set of NN layers may include one or more nodes (or artificial neurons, represented by circles, for example). Outputs of all nodes in the input NN layer may be coupled to at least one node of hidden NN layer(s). Similarly, inputs of each hidden NN layer may be coupled to outputs of at least one node in other layers of the NN model. Outputs of each hidden NN layer may be coupled to inputs of at least one node in other NN layers of the NN model. Node(s) in the final NN layer may receive inputs from at least one hidden NN layer to output a result. The number of NN layers and the number of nodes in each NN layer may be determined from hyper-parameters of the NN model. Such hyper-parameters may be set before, while training, or after training the NN model on a training dataset.

Each node of the NN model may correspond to a mathematical function (e.g., a sigmoid function or a rectified linear unit) with a set of parameters, tunable during training of the network. The set of parameters may include, for example, a weight parameter, a regularization parameter, and the like. Each node may use the mathematical function to compute an output based on one or more inputs from nodes in other NN layer(s) (e.g., previous NN layer(s)) of the neural network. All or some of the nodes of the neural network may correspond to same or a different same mathematical function. In training of the NN model, one or more parameters of each node of the neural network may be updated based on whether an output of the final NN layer for a given input (from the training dataset) matches a correct result based on a loss function for the neural network. The above process may be repeated for same or a different input until a minima of loss function may be achieved, and a training error may be minimized. Several methods for training are known in art, for example, gradient descent, stochastic gradient descent, batch gradient descent, gradient boost, meta-heuristics, and the like.

The second ML model 110B may be a classifier model which may be trained to identify a relationship between inputs, such as features in a training dataset and output labels. The second ML model 110B may be applied on the received reference-emotion audio 114C and a second domain code associated with the received reference-emotion audio 114C. Based on the application of the second ML model 110B, an emotion style code associated with the received reference-emotion audio 114C may be determined. Details related to the second ML model 110B may be similar to the first ML model 110A. Hence, such details have been omitted for the sake of brevity of the disclosure.

The third ML model 110C may be a machine learning model that may be applied on the received source audio 114A, the determined speaker style code, and the determined emotion style code. The generation of the converted audio may be based on the application of the third ML model 110C. Details related to the third ML model 110C may be similar to the first ML model 110A. Hence, such details have been omitted for the sake of brevity of the disclosure.

The source speaker classifier 112A may be a classifier model that may be applied on the generated converted audio. Based on the application of the source speaker classifier 112A on the generated converted audio, a domain of a source speaker generated converted audio may be determined. Details related to the source speaker classifier 112A may be similar to the first ML model 110A. Hence, such details have been omitted for the sake of brevity of the disclosure.

The source emotion classifier 112B may be a classifier model that may be applied on the generated converted audio. Based on the application of the source emotion classifier 112B on the generated converted audio, a domain of an emotion associated with the generated converted audio may be determined. Further, details related to the source emotion classifier 112B may be similar to the first ML model 110A. Hence, such details have been omitted for the sake of brevity of the disclosure.

The adversarial model 112C may be an ML model that may be re-trained based on the application of each of the source speaker classifier 112A and the source emotion classifier 112B on the converted audio. The re-trained adversarial model 112C may facilitate the third ML model 110C to convert an input audio, associated with the first user, to an output audio associated with the identity of the second user and the emotion of the third user. In an embodiment, the adversarial model 112C may include a discriminator model. The discriminator model may be a type of a classifier model that may classify whether an output, generated by a generator model (i.e., the third ML model 110C), is real or fake. The discriminator model may classify the converted audio as real or fake. Details related to the adversarial model 112C and the discriminator model may be similar to the first ML model 110A. Hence, such details have been omitted for the sake of brevity of the disclosure.

The annealing model 112D may be an ML model that may be applied on a fundamental frequency loss and a norm consistency loss associated with the generated converted audio. Based on the application of the annealing model 112D, a set of weights associated with the fundamental frequency loss and the norm consistency loss may be determined. Further, details related to the annealing model 112D may be similar to the first ML model 110A. Hence, such details have been omitted for the sake of brevity of the disclosure.

The audio data 114 may include the source audio 114A, the reference-speaker audio 114B, and the reference-emotion audio 114C. The source audio 114A may be source audio data, for example, voice data associated with a source speaker (i.e., the first user) with a neutral emotion. An identity and/or an emotion (of the source speaker) associated with the voice data (i.e., voice content) may be required to be converted into voice data associated with an identity of a target speaker (for example, the second user) and an emotion of the target speaker or another speaker (for example, the third user). The reference-speaker audio 114B may be, for example, voice data associated with the target speaker (i.e., the second user) with a neutral or non-neutral emotion. The reference-emotion audio 114C, for example, voice data associated with a speaker (i.e., the third user) with a target emotion. In an embodiment, the source audio 114A may correspond to a neutral-emotion spectrogram associated with the first user. The reference-speaker audio 114B may correspond to a user-identity spectrogram associated with the second user. The reference-emotion audio 114C may correspond to a non-neutral emotion spectrogram associated with the third user. In some embodiments, the first user may be same as the second user. In other embodiments, the second user may be same as the third user. In yet another embodiment, the first user, the second user, and the third user may be different users.

In operation, the electronic device 102 may be configured to receive the source audio 114A associated with the first user. The source audio 114A may be an audio that may be associated with an identity of the first user and a neutral emotion. The identity and/or the (neutral) emotion, to which the source audio 114A may be associated, may be required to be converted to an identity of a target speaker and a target emotion. In an example, the electronic device 102 may transmit a request the database 106 to retrieve the source audio 114A. On reception of the request, the database 106 may verify the request, and based on the verification, the server 104 may transmit the source audio 114A to the electronic device 102. Details related to reception of the source audio 114A are further provided, for example, in FIG. 3A (at 302).

The electronic device 102 may be further configured to receive the reference-speaker audio 114B associated with the second user. The reference-speaker audio 114B may be voice content that may be associated with an identity of the second user. The second user may be a target speaker. The electronic device 102 may determine a speaker style code based on the reference-speaker audio 114B. After the conversion of the source audio 114A, audio content of the source audio 114A may be associated with the identity of the target speaker. In an embodiment, the electronic device 102 may transmit a request to the database 106 to retrieve the reference-speaker audio 114B. On reception of the request, the database 106 may verify the request and, based on the verification, the server 104 may transmit the reference-speaker audio 114B to the electronic device 102. Details related to reception of the reference-speaker audio 114B are further provided, for example, in FIG. 3A (at 304).

The electronic device 102 may be further configured to receive the reference-emotion audio 114C associated with the third user. The reference-emotion audio 114C may be voice content that may be associated with an emotion of the third user. The emotion may be a target emotion. The electronic device 102 may determine an emotion style code based on the reference-emotion audio 114C. After the conversion of the source audio 114A, audio content of the source audio 114A may be associated with the identity of the target speaker and the target emotion. In an embodiment, the electronic device 102 may transmit a request to the database 106 to retrieve the reference-emotion audio 114C. On reception of the request, the database 106 may verify the request and based on the verification, the server 104 may transmit the reference-emotion audio 114C to the electronic device

102. Details related to reception of the reference-emotion audio 114C are further provided, for example, in FIG. 3A (at 306).

The electronic device 102 may be further configured to apply the set of ML models 110 on the source audio 114A, the reference-speaker audio 114B, and the reference-emotion audio 114C. The source audio 114A, the reference-speaker audio 114B, and the reference-emotion audio 114C may be provided as inputs to the set of ML models 110. Details related to the application of the set of ML models 110 are further provided, for example, in FIG. 3A (at 308).

The electronic device 102 may be further configured to generate the converted audio based on the application of the set of ML models 110. The generated converted audio may be associated with the content of the source audio 114A, the identity of the second user (i.e., the target speaker), and the emotion of (i.e., the target emotion) the third user. The set of ML models 110 may transform the identity (of the first user) and emotion (neutral emotion) to which the content of the source audio 114A may be associated. The transformation may be based on the identity (of the second user or the target speaker) to which the reference-speaker audio 114B may be associated and the emotion (i.e., the target emotion) to which the reference-emotion audio 114C may be associated. The transformation may result in the generation of the converted audio, which may include a speaker style associated with the reference-speaker audio 114B and an emotional style associated with the reference-emotion audio 114C. Details related to the generation of the converted audio are further provided, for example, in FIG. 3A (at 310).

The electronic device 102 may be further configured to apply each of the source speaker classifier 112A and the source emotion classifier 112B on the generated converted audio. Based on the application of the source speaker classifier 112A and the source emotion classifier 112B, the electronic device 102 may determine a source speaker domain and an emotion domain associated with the generated converted audio. An output of the speaker classifier 112A may indicate whether an identity associated with the converted audio belongs to the target speaker (whose identity may be associated with the reference-speaker audio 114B). Similarly, an output of the source emotion classifier 112B may indicate whether an emotion associated with the converted audio is the target emotion (i.e., the emotion associated with the reference-emotion audio 114C). Details related to the application of each of the source speaker classifier 112A and the source emotion classifier 112B are further provided, for example, in FIG. 3B (at 312).

The electronic device 102 may be further configured to re-train the adversarial model 112C based on the application of each of the source speaker classifier 112A and the source emotion classifier 112B. The re-training of the adversarial model 112C may facilitate conversion (by the third ML model 110C) of an input audio, associated with the first user, to the output audio. The output audio may be associated with the identity of the second user and associated with the emotion of the third user. An input audio associated with the first user may be converted (by the third ML model 110C) to an output audio associated with the identity of the second user and associated with the emotion of the third user based on the re-training of the adversarial model 112C. Details related to the re-training of the adversarial model 112C are further provided, for example, in FIG. 3B.

Figure 2:
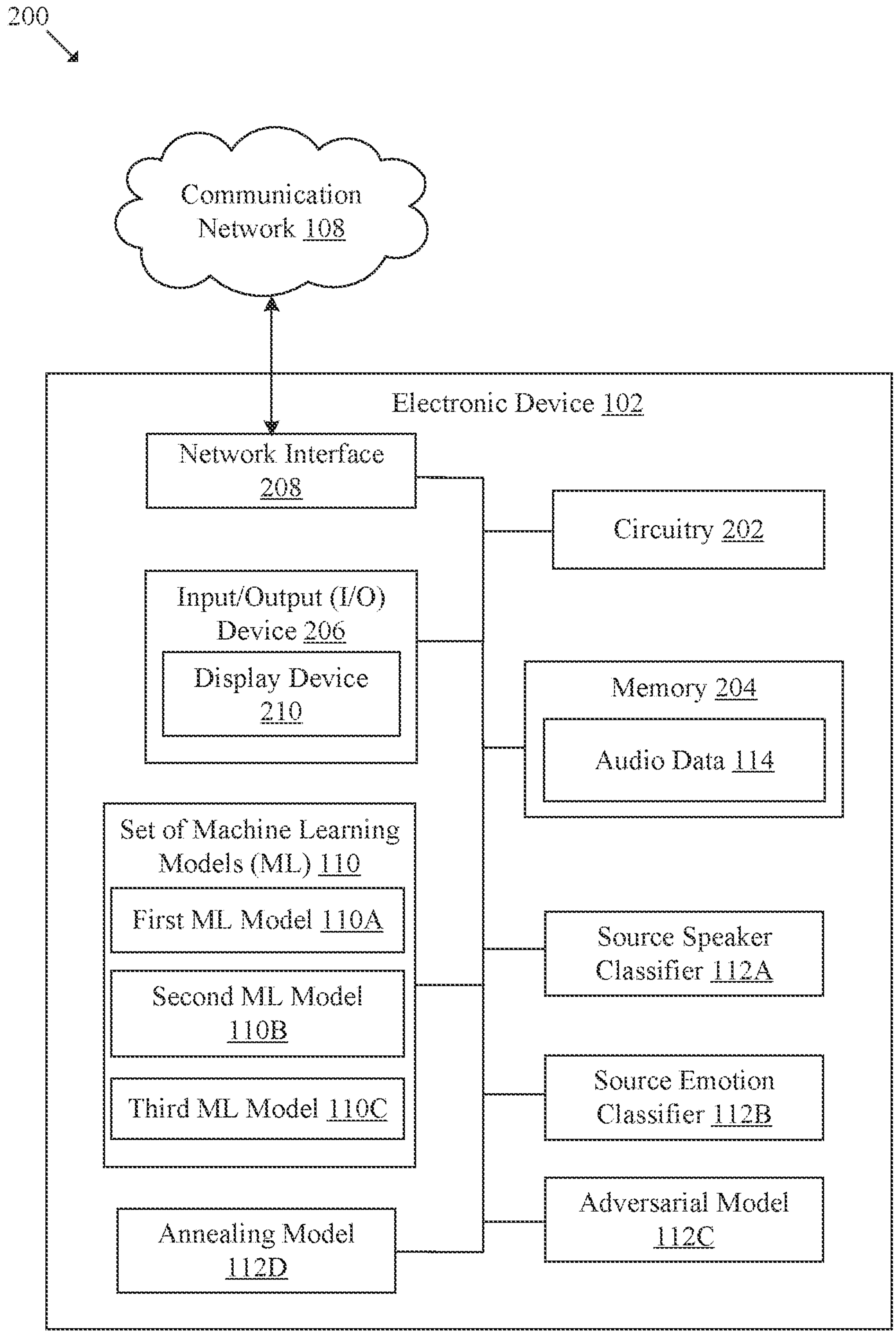
FIG. 2 is a block diagram that illustrates an exemplary electronic device of FIG. 1, in accordance with an embodiment of the disclosure.

FIG. 2 is a block diagram that illustrates an exemplary electronic device of FIG. 1, in accordance with an embodiment of the disclosure. FIG. 2 is explained in conjunction with elements from FIG. 1. With reference to FIG. 2, there is shown the exemplary electronic device 102. The electronic device 102 may include circuitry 202, a memory 204, an input/output (I/O) device 206, a network interface 208, the set of ML models 110, the source speaker classifier 112A, the source emotion classifier 112B, the adversarial model 112C, and the annealing model 112D. The set of ML models 110 may include the first ML model 110A, the second ML model 110B, and the third ML model 110C. The memory 204 may include the audio data 114. The input/output (I/O) device 206 may include a display device 210.

The circuitry 202 may include suitable logic, circuitry, and/or interfaces that may be configured to execute program instructions associated with different operations to be executed by the electronic device 102. The operations may include source audio reception, reference-speaker audio reception, reference-emotion audio reception, set of ML models application, converted audio generation, classifier application, and adversarial model retraining. The circuitry 202 may include one or more processing units, which may be implemented as a separate processor. In an embodiment, the one or more processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may include suitable logic, circuitry, interfaces, and/or code that may be configured to store one or more instructions to be executed by the circuitry 202. The one or more instructions stored in the memory 204 may be configured to execute the different operations of the circuitry 202 (and/or the electronic device 102). The memory 204 may be further configured to store the audio data 114 (which may be retrieved from the database 106) and the converted audio. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive an input and provide an output based on the received input. For example, the I/O device 206 may receive a first user input indicative of a request to convert the source audio 114A. The first user input may include the source audio 114A. For example, the I/O device 206 may include a microphone through which the user 116 may record a voice of the user 116 as the source audio 114A. Alternatively, the source audio 114A may be selected by the user 116 from a set of audio files stored on the electronic device 102. The I/O device 206 may be further configured to render the converted audio. The I/O device 206 may include the display device 210. Examples of the I/O device 206 may include, but are not limited to, a display (e.g., a touch screen), a keyboard, a mouse, a joystick, a microphone, or a speaker. Examples of the I/O device 206 may further include braille I/O devices, such as, braille keyboards and braille readers.

The network interface 208 may include suitable logic, circuitry, interfaces, and/or code that may be configured to facilitate communication between the electronic device 102 and the server 104, via the communication network 108. The network interface 208 may be implemented by use of various known technologies to support wired or wireless communication of the electronic device 102 with the communication network 108. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to communicate via wireless communication with networks, such as the Internet, an Intranet, a wireless network, a cellular telephone network, a wireless local area network (LAN), or a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), $5^{th}$ Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The display device 210 may include suitable logic, circuitry, and interfaces that may be configured to render information based on instructions or inputs received from the circuitry 202 or the I/O device 206. The display device 210 may be a touch screen which may enable a user (e.g., the user 116) to provide a user-input via the display device 210. The touch screen may be at least one of a resistive touch screen, a capacitive touch screen, or a thermal touch screen. The display device 210 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 210 may refer to a display screen of a head mounted device (HMD), a smart-glass device, a see-through display, a projection-based display, an electro-chromic display, or a transparent display. Various operations of the circuitry 202 for ML based emotion and voice conversion in audio using virtual domain mixing and fake pair-masking are described further, for example, in FIGS. 3A and 3B.

Figure 3A:
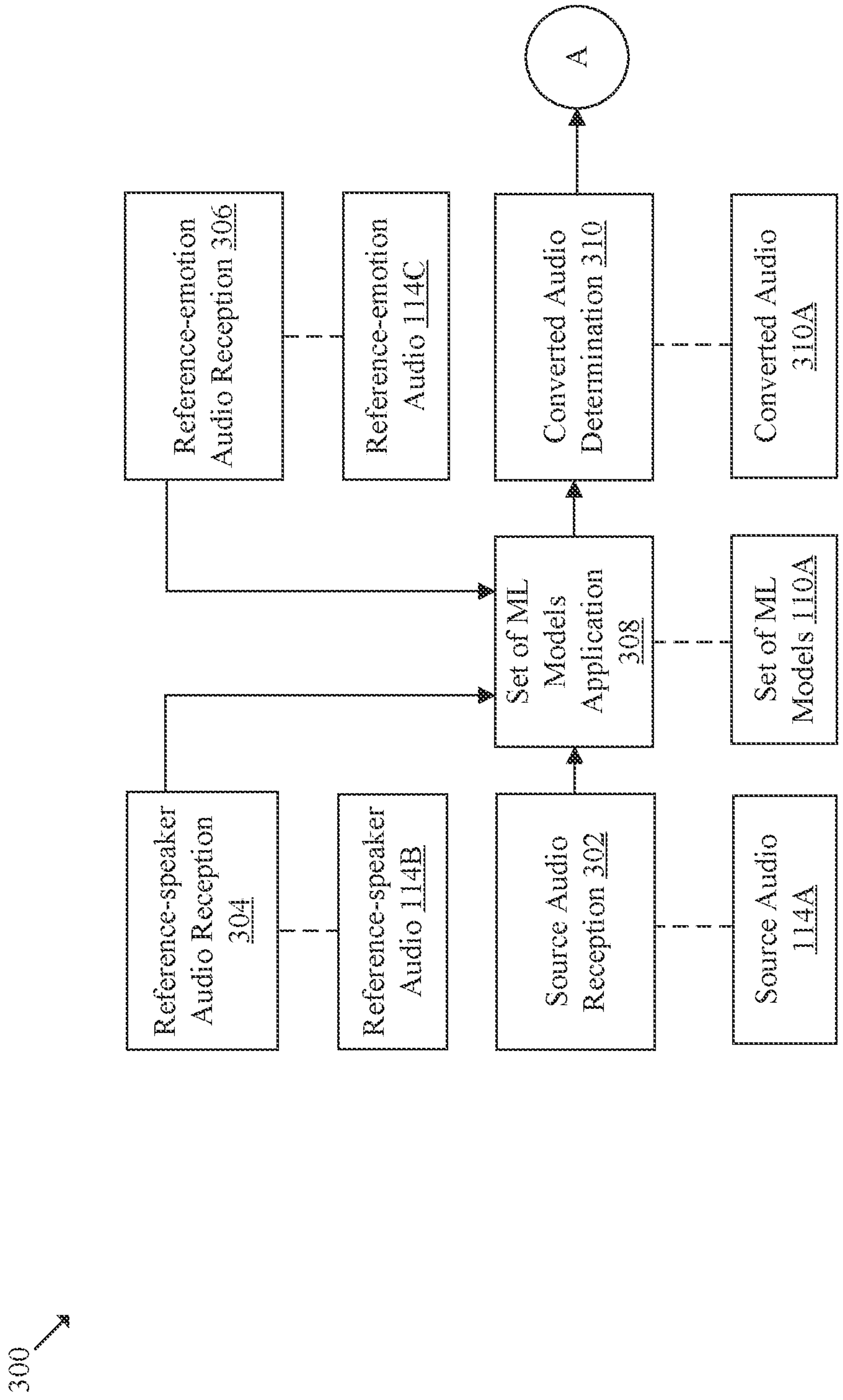
FIGS. 3A and 3B are diagrams that collectively illustrate an exemplary processing pipeline for ML-based emotion and voice conversion in audio using virtual domain mixing and fake pair-masking, in accordance with an embodiment of the disclosure.
Figure 3B:
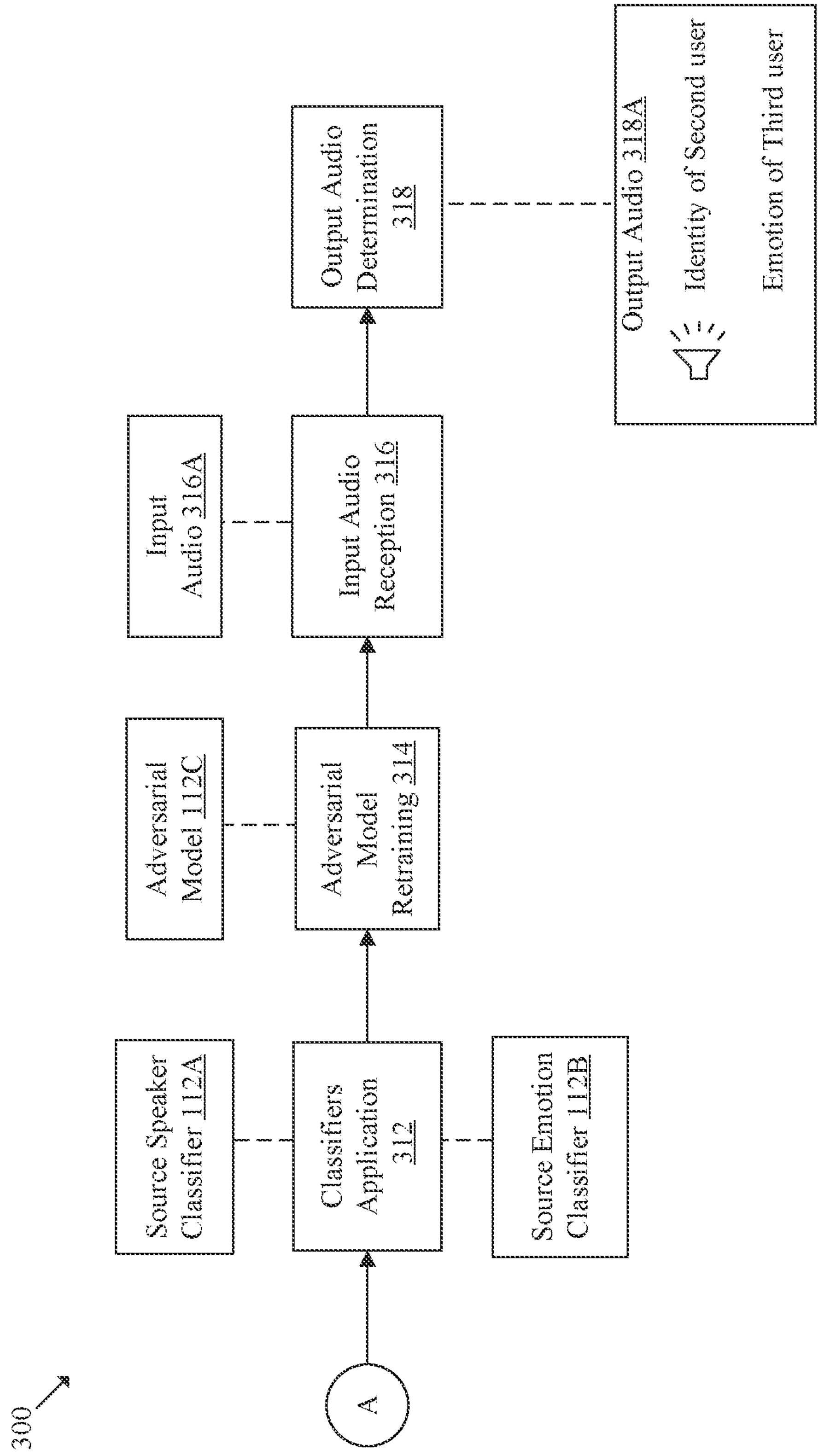

FIGS. 3A and 3B are diagrams that collectively illustrate an exemplary processing pipeline for the ML based emotion and voice conversion in audio using virtual domain mixing and fake pair-masking, in accordance with an embodiment of the disclosure. FIGS. 3A and 3B are explained in conjunction with elements from FIG. 1 and FIG. 2. With reference to FIGS. 3A and 3B, there is shown, an exemplary processing pipeline 300 that illustrates exemplary operations from 302 to 318 for ML-based emotional voice conversion based on virtual domain mixing and fake pair-masking. The exemplary operations 302 to 318 may be executed by any computing system, for example, by the electronic device 102 of FIG. 1 or by the circuitry 202 of FIG. 2. FIGS. 3A and 3B further include the source audio 114A, the reference-speaker audio 114B, the reference-emotion audio 114C, the set of ML models 110, a converted audio 310A, the source speaker classifier 112A, the source emotion classifier 112B, the adversarial model 112C, an input audio 316A, and an output audio 318A.

With reference to FIG. 3A, at 302, an operation of source audio reception may be executed. The circuitry 202 may be configured to receive the source audio 114A associated with the first user. The source audio 114A may be voice data associated with an identity of a source speaker and an emotion of the source speaker. The identity and/or emotion may be required to be converted. For example, the source audio 114A (i.e., the voice data) may be a voice of the first user such as, the user 116, which may be recorded and may be received as the source audio 114A.

In an embodiment, the source audio 114A may correspond to a neutral-emotion spectrogram associated with the first user. The spectrogram may be extracted from the source audio 114A, which may be a sentence spoken by the first user (i.e., source speaker) with a neutral emotion. It may be appreciated that a spectrogram (the neutral-emotion spectrogram herein) may be used to visually represent a signal strength such as, an intensity, a loudness, and the like, of an audio signal (the source audio 114A herein) over time for a spectrum of frequencies.

At 304, an operation of the reference-speaker audio reception may be executed. The circuitry 202 may be configured to receive the reference-speaker audio 114B associated with the second user. The reference-speaker audio 114B may be voice data associated with an identity of the second user (i.e., a target speaker). The circuitry 202 may use the reference-speaker audio 114B to determine a speaker style code. For example, the reference-speaker audio 114B may be a voice recording of a sentence spoken by the target speaker. The sentence may be spoken in a neutral-emotion. In an embodiment, the reference-speaker audio 114B may correspond to an user identity spectrogram associated with the identity of the second user (i.e., the target speaker). The user identity spectrogram may be extracted from the reference-speaker audio 114B (i.e., the sentence spoken by the second user).

At 306, an operation of the reference-emotion audio reception may be executed. The circuitry 202 may be configured to receive the reference-emotion audio 114C associated with the third user. The reference-emotion audio 114C may be voice data that may be associated with an emotion (i.e., a target emotion) of the third user. The circuitry 202 may use the reference-emotion audio 114C to determine an emotion style code. For example, the reference-emotion audio 114C may be a voice recording of a sentence spoken by the third user with an angry emotion that may be a target emotion. The emotion associated with the source audio 114A may be converted from neutral to the target emotion (i.e., the angry emotion). In an embodiment, the reference-emotion audio 114C may correspond to a non-neutral emotion (such as an angry emotion) spectrogram associated with the third user. The non-neutral emotion spectrogram may be extracted from the reference-emotion audio 114C (i.e., sentence spoken by the third user). In some embodiments, the first user may be same as the second user. In other embodiments, the second user may be same as the third user. In yet another embodiment, the first user, the second user, and the third user may be different users.

At 308, an operation of the set of ML models application may be executed. The circuitry 202 may be configured to apply the set of ML models 110 on each of the source audio 114A, the reference-speaker audio 114B, and the reference-emotion audio 114C. The set of ML models 110 may include the first ML model 110A, the second ML model 110B, and the third ML model 110C.

In an embodiment, the circuitry 202 may be configured to apply the first ML model 110A (for example, a speaker style encoder model), of the set of ML models 110, on the reference-speaker audio 114B and a first domain code associated with the received reference-speaker audio 114B. Herein, the first domain code may be a speaker domain code. The received reference-speaker audio 114B and the first domain code may be provided as inputs to the first ML model 110A (i.e., the speaker style encoder model).

The speaker style encoder may extract the speaker style code from the first domain code. In an embodiment, the speaker style encoder model may process the reference-speaker audio 114B for a set of domain codes to obtain a set of shared features. Thereafter, a first domain projection may be used to map the obtained set of shared features to the first domain code. Thus, the circuitry 202 may be configured to determine the speaker style code associated with the reference-speaker audio 114B based on the application of the first ML model 110A on the reference-speaker audio 114B. The speaker style code may be obtained according to an equation (1):

$$h_{spk}=S_{spk}(R_{spk},y_{spk}) \quad (1),$$

where "$S_{spk}$" may be a function associated with the speaker style encoder model (i.e., the first ML model 110A), "$h_{spk}$" may be the speaker style code, "$R_{spk}$" may be a reference spectrogram (i.e., the user identity spectrogram) associated with the (identity of) the second user (i.e., the target speaker), and "$y_{spk}$" may correspond to the first domain code.

The circuitry 202 may be configured to apply the second ML model 110B (for example, an emotion style encoder model), of the set of ML models 110, on the reference-emotion audio 114C and a second domain code associated with the reference-emotion audio 114C. Herein, the second domain code may be an emotion domain code. The reference-emotion audio 114C and the second domain code may be provided as inputs to the second ML model 110B (i.e., the emotion style encoder model). The emotion style encoder model may extract the emotion style code from the second domain code. In an embodiment, the emotion style encoder model may process the reference-emotion audio 114C for a set of domain codes to obtain a set of shared features. Thereafter, a second domain projection may be used to map the obtained set of shared features to the second domain code. Thus, the circuitry 202 may be configured to determine the emotion style code associated with the reference-emotion audio 114C based on the application of the second ML model 110B on the reference-emotion audio 114C. In an example, the emotion style code may be obtained according to an equation (2):

$$h_{emo}=S_{emo}(R_{emo},y_{emo}) \quad (2),$$

where "$S_{emo}$" may be a function associated with the emotion style encoder model (i.e., the second ML model 110B), "$h_{emo}$" may be the emotion style code, "$R_{emo}$" may be a reference spectrogram (i.e., the non-neutral emotion (i.e., the target emotion) spectrogram) associated with the third user, and "$y_{emo}$" may correspond to the second domain code.

The circuitry 202 may be configured to apply the third ML model 110C, of the set of ML models 110 on the source audio 114A, the determined speaker style code, and the determined emotion style code. The source audio 114A, the speaker style code, and the emotion style code may be provided as inputs to the third ML model 110C.

In an embodiment, the third ML model 110C may be a generator model. The generator model may convert the source audio 114A into a converted audio with a target style as specified by one or more style embeddings (i.e., speaker identity embedding and emotion embedding). Herein, the style embeddings may be the speaker style code (associated with the identity of the target speaker, i.e., the second user), and the emotion style code (associated with the target emotion (such as, an angry emotion)).

In an embodiment, the generator model may include an encoder model, an adder model, and a decoder model. The encoder model may determine an encoded vector associated with the source audio 114A. The adder model may determine a summation of two or more inputs. The decoder model may generate a converted audio 310A.

In an embodiment, the circuitry 202 may be configured to apply the encoder model on the source audio 114A. The source audio 114A may be provided as an input to the encoder model. Based on the application of the encoder model on the source audio 114A, an encoded vector may be determined as an output of the encoder model. In an example, the encoded vector may correspond to a latent feature vector "$h_x$" associated with the received source audio 114A.

The circuitry 202 may be further configured to apply a fundamental frequency network on the source audio 114A to determine a fundamental frequency. The fundamental frequency may correspond to a pitch of an audio waveform. The fundamental frequency network may be a joint detection and classification (JDC) network comprising a set of convolutional layers and one or more bidirectional long short-term memory (BLSTM) units. The JDC network may be pre-trained to extract the fundamental frequency from the source spectrogram (i.e., the neutral-emotion spectrogram which may be associated with the first user and to which the source audio 114A may correspond).

The circuitry 202 may be further configured to apply the adder model on the determined encoded vector and the determined fundamental frequency. The circuitry 202 may be further configured to determine a first vector based on the application of the adder model. The adder model may accumulate the encoded vector and the fundamental frequency for the determination of the first vector.

The circuitry 202 may be further configured to apply the decoder model on the first vector, the speaker style code, and the emotion style code. The determined first vector, the determined speaker style code, and the determined emotion style code may be provided as an input to the decoder model.

At 310, an operation of converted audio 310A determination may be executed. The circuitry 202 may be configured to determine the converted audio 310A based on the application of the set of ML models 110. The generated converted audio 310A may be associated with content of the source audio 114A (i.e., the sentence spoken by the first user or source speaker, which may be received as the source audio 114A). The converted audio 310A may be further associated with the identity (to which the reference-speaker audio 114B may be associated) of the second user (i.e., the target speaker) and the emotion (i.e., the target emotion) of the third user. The set of ML models 110 may process the source audio 114A, the reference-speaker audio 114B, and the reference-emotion audio 114C to convert the source audio 114A into the converted audio 310A. In an example, the source audio 114A may be associated with a first user or a source speaker "John". The source audio 114A may be a first sentence spoken with a neutral emotion and correspond to a neutral emotion spectrogram. The reference-speaker audio 114B may be associated with an identity of a second user or a target speaker "Mark". The reference-speaker audio 114B may be a second sentence spoken with a neutral or non-neutral emotion and correspond to a user identity (Mark's identity) spectrogram. The reference-emotion audio 114C may associated with a target emotion (for example, "angry" emotion). The reference-emotion audio 114C may be a third sentence spoken by a third user "Tom" with an "angry" emotion. The source audio 114A may be required to be converted such that a converted audio (such as, the converted audio 310A), is associated with linguistic content of the first sentence, the speaker style (i.e., identity) of the second user (i.e., the target speaker "Mark") and the emotion style of the third user "Tom" . . . thus, based on the source audio 114A, the reference-speaker audio 114B and the reference-emotion audio 114C, the converted audio 310A may be generated. It may be noted that a linguistic content of the received source audio 114A, the received reference-speaker audio 114B, and the received reference-emotion audio 114C may be similar or dissimilar. However, the linguistic content of the source audio 114A and the linguistic content of the converted audio 310A may be same or identical. The converted audio 310A may be similar to an audio that may include the first sentence, is spoken by the second user (i.e., "Mark", the target speaker) and has an (angry) emotion (i.e., the target emotion) of the third user (i.e., "Tom").

In an embodiment, the generation of the converted audio 310A may be further based on the application of the third ML model 110C. As discussed above, the third ML model 110C, of the set of ML models 110 may be applied on each of the source audio 114A, the speaker style code, and the emotion style code (which are inputs to the third ML model 110C or generator model). The third ML model 110C may convert the received source audio 114A into the converted audio 310A based on the speaker style code and the emotion style code. As the determined speaker style code may be associated with the reference-speaker audio 114B and the emotion style code may be associated with the reference-emotion audio 114C, the converted audio 310A may be associated with the identity of the second user and the emotion of the third user.

In an embodiment, the generation of the converted audio 310A may be based on the application of the decoder model. Herein, the decoder model may be applied on the determined first vector, the determined speaker style code, and the determined emotion style code. The decoder model may process the determined first vector, the determined speaker style code, and the determined emotion style code so as to generate the converted audio 310A.

With reference to FIG. 3B, at 312, an operation of classifier application may be executed. The circuitry 202 may be configured to apply each of the source speaker classifier 112A and the source emotion classifier 112B on the generated converted audio 310A. The source speaker classifier 112A may determine whether the generated converted audio 310A is associated with the identity of the second user (i.e., the target speaker). The source emotion classifier 112B may determine whether the generated converted audio 310A is associated with the emotion (i.e., the target emotion) of the third user. For example, the source speaker classifier 112A may determine whether the speaker of the linguistic content of the converted audio 310A is "Mark" and the source emotion classifier 112B may determine whether the linguistic content of the converted audio 310A is spoken with an "angry" emotion (i.e., the emotion of "Tom"). The determinations may be based on the first domain code and the second domain code.

At 314, an operation of adversarial model re-training may be executed. The circuitry 202 may be configured to re-train the adversarial model 112C based on the application of each of the source speaker classifier 112A and the source emotion classifier 112B.

The adversarial model 112C may be re-trained to optimize an optimization function. The optimization function may be associated with an adversarial loss, an adversarial source classifier loss, a style reconstruction loss, and a style diversification loss. The adversarial loss may be determined according to an equation (3):

$$\mathcal{L}_{adv}=\mathbb{E}_{X,y_{src}}[\log D(X,y_{src})]+\mathbb{E}_{X,y_{trg},h_{spk},h_{emo}}[\log(1-D(G(X,h_{spk},h_{emo}),y_{trg}] \quad (3),$$

where "$\mathcal{L}_{adv}$" may be the adversarial loss, "X" may be the source spectrogram (i.e., the neutral-emotion spectrogram associated with the first user), "$y_{src}$" may be a source domain, "D" may be a function associated with the discriminator model, "$y_{trg}$" may be a target domain, "$h_{spk}$" may be the speaker style code, and "$h_{emo}$" may be the emotion style code. It may be noted that "D(·,y)" may denote whether an output may be real or fake for a domain "y∈Y".

The source speaker classifier 112A and the source emotion classifier 112B may be trained to classify a speaker identity and a speaker emotion associated with the converted audio 310A based on a cross entropy loss. The adversarial source classifier loss may be determined according to an equation (4):

$$\mathcal{L}_{advcls}=\mathbb{E}_{X,y_{spk},h_{spk}}[CE(C_{spk}(G(X,h_{spk},h_{emo})),y_{spk})]+(\log D(X,y_{src})]+\mathbb{E}_{X,y_{emo},h_{spk}}[CE(C_{emo}(G(X,h_{spk},h_{emo})),y_{emo})] \quad (4),$$

where "X" may be the source spectrogram (i.e., the neutral-emotion spectrogram associated with the first user), "$y_{spk}$" may correspond to the first domain code, "$h_{spk}$" may be the speaker style code, "CE(·)" may be the cross entropy loss, "G(·)" may be a generator function associated with the third ML model 110C, "$h_{emo}$" may be the emotion style code, "D" may be a function associated with the discriminator model, "$y_{src}$" may be a source domain, and "$y_{emo}$" may correspond to the second domain code.

The style reconstruction loss may be used to determine style codes, such as, a speaker style code and an emotion style code associated with the converted audio 310A. The style reconstruction loss may be determined according to an equation (5):

$$\mathcal{L}_{sty}=\mathbb{E}_{X,y_{spk},h_{spk}}\|h_{spk}-S_{spk}(G(X,h_{spk},h_{emo}),y_{spk})\|$$

$$\mathbb{E}_{X,y_{emo},h_{emo}}\|h_{emo}-S_{emo}(G(X,h_{spk},h_{emo}),y_{emo}) \quad (5),$$

where "$\mathcal{L}_{sty}$" may be the style reconstruction loss, "X" may be the source spectrogram (i.e., the neutral-emotion spectrogram associated with the first user), "$y_{spk}$" may correspond to the first domain code, "$h_{spk}$" may be the speaker style code, "$S_{spk}$" may be a function associated with the speaker style encoder model (i.e., the first ML model 110A), "G(·)" may be a generator function associated with the third ML model 110C, "$h_{emo}$" may be the emotion style code, "$y_{emo}$" may correspond to the second domain code, and "$S_{emo}$" may be a function associated with the emotion style encoder model (i.e., the second ML model 110B).

The style diversification loss may be used to ensure a diversity of generated samples with different style embeddings. The style diversification loss may be determined according to an equation (6):

$$\mathcal{L}_{ads}=\mathbb{E}_{X,y_{spk},h_{spk}}\|G(X,h_{spk},h_{emo})-G(X,h_{spk},h'_{emo})\|+\mathbb{E}_{X,y_{spk},h_{spk}}\|G(X,h_{spk},h_{emo})-G(X,h'_{spk},h_{emo})\|+\mathbb{E}_{X,y_{spk},h_{spk}}\|G(X,h'_{spk},h_{emo})-G(X,h'_{spk},h'_{emo})\| \quad (6),$$

where "$\mathcal{L}_{ads}$" may be the style diversification loss, "X" may be the source spectrogram (i.e., the neutral-emotion spectrogram associated with the first user), "$y_{spk}$" may correspond to the first domain code, "$h_{spk}$" may be the speaker style code (generated as output of the first ML model 110A), "G(·)" may be a generator function associated with the third ML model 110C, "$h_{emo}$" may be the emotion style code (generated as output of the second ML model 110B), $h'_{emo}$" may be another emotion style code, and "$h'_{spk}$" may be another speaker style code. Based on each of the adversarial loss, the adversarial source classifier loss, the style reconstruction loss, and the style diversification loss, the adversarial model 112C may be re-trained.

In an embodiment, the circuitry 202 may be further configured to determine a fundamental frequency loss and a norm consistency loss associated with the generated converted audio 310A. The determination of the fundamental frequency loss may be based on equation (7) stated below:

$$\mathcal{L}_{fo}=\mathbb{E}_{X,s}\left[\left\|\hat{F}(X)-\hat{F}(G(X,s))\right\|\right],\ \hat{F}(X)=\frac{F(X)}{\|F(X)\|}, \quad (7)$$

where "$\mathcal{L}_{fo}$" may be the fundamental frequency loss, "X" may be the source spectrogram "F(X)" (i.e., the neutral-emotion spectrogram associated with the first user) may determine a fundamental frequency in Hertz for the "X", and "$\hat{F}(X)$" may be a temporal mean. As an average fundamental frequency for a male speaker and a female speaker may be different, the temporal mean may be taken into account while determining the fundamental frequency loss.

The norm consistency loss may be determined based on equation (8):

$$\mathcal{L}_{norm}=\mathbb{E}_{X,s}\left[\frac{1}{T}\sum_{t=1}^{T}\left|\|X_{\cdot,t}\|-\|G(X,s)_{\cdot,t}\|\right|\right],\text{ where } \quad (8)$$

$$t\in\{1,2,\ldots,T\},\ \|X_{\cdot,t}\|=\sum_{n=1}^{N}|X_{n,t}|,$$

where "$\mathcal{L}_{norm}$" may be the norm consistency loss, "X" may be the source spectrogram (i.e., the neutral-emotion spectrogram associated with the first user), "t" may be a frame index. the norm consistency loss may be used to maintain silence intervals that may be present in "X".

Thereafter, the circuitry 202 may be configured to apply the annealing model 112D on the fundamental frequency loss and the norm consistency loss. The circuitry 202 may be further configured to determine the set of weights associated with the determined fundamental frequency loss and the determined norm consistency loss, based on the application of the annealing model 112D. The set of weights may be determined by decreasing a first set of weights associated with the fundamental frequency loss and the norm consistency loss gradually and linearly in each iteration. The third ML model 110C may be re-trained further based on the determined set of weights. Moreover, in some cases, an ML model may be trained with respect to annealing, another ML model may be trained with respect to the fundamental frequency loss, and yet another ML model may be trained with respect to the norm consistency loss, in order to determine an effectiveness of the annealing model 112D.

In an embodiment, the adversarial model 112C may include a discriminator model. It may be appreciated that the discriminator model may be a type of a classifier model that may classify whether an output generated by a generator model (i.e., the third ML model 110C) is real or fake. The output may be real if an identity associated with the converted audio 310A belongs to the second user or the target speaker, and an emotion associated with the converted audio 310 is determined to be the target emotion. In an example, the discriminator model may provide a binary output, where a binary output "1" may indicate that the output generated by the generator model is real and a binary output "0" may indicate that the output generated by the generator model is fake. Based on whether the output generated by the generator model is real or fake, the generator model (i.e., the third ML model 110C) may be re-trained. The discriminator model of the present disclosure may classify whether the converted audio 310A is real or fake based on the application of each of the source speaker classifier 112A and the source emotion classifier 112B on the converted audio 310A. The outputs of the classifiers (i.e., the source speaker classifier 112A and the source emotion classifier 112B) may be used during the training phase to calculate adversarial source classifier loss. The classifiers (i.e., the source speaker classifier 112A and the source emotion classifier 112B) enable the generator model to generate samples that include target speaker style and target emotion style. However, the adversarial network (including, for example, the discriminator model) may not be used during the inference phase.

The third ML model 110C (i.e., the generator model) may be re-trained based on an output of the discriminator model (i.e., the classifiers). For example, the adversarial loss calculated using the classifiers during the training phase may be used to re-train the third ML model 110C. The reference-speaker audio 114B and the reference-emotion audio 114C may be associated with unseen (for the generator and discriminator models) pairs of speaker identity and emotion. Thus, the converted audio 310A, generated based on the source audio 114A, the reference-speaker audio 114B, and the reference-emotion audio 114C, may be classified as fake based on the application of the discriminator model on the converted audio 310A. In order to mitigate such labelling (for example, fake) by the discriminator model, a fake pair masking strategy may be employed. The fake pair masking strategy may involve masking outputs of the third ML model 110C (i.e., the generator model), for re-training of the adversarial model 112C (i.e., the discriminator model), in scenarios where a converted audio (generated as an output of the generator or the third ML model 110C) is associated with unseen speaker-emotion pair. As the speaker identity-emotion pair associated with the converted audio 310A is unseen to the discriminator model, fake masking may be involved. Thus, the discriminator model may be applied on the fake-masked converted audio 310A for retraining of the discriminator model.

The circuitry 202 may be further configured to apply the discriminator model on the generated converted audio 310A based on a determination that speaker identity-emotions pair associated with the converted audio 310A is a seen pair for the discriminator model. Thereafter, the discriminator model may be applied on the generated converted audio 310A to determine whether the generated converted audio 310A is real or fake. Based on an output of the discriminator model, the third ML model 110C may be re-trained.

At 316, an operation of input audio reception may be executed. The circuitry 202 may be configured to receive the input audio 316A. The input audio 316A may be associated with the first user such as, the user 116. Herein, an identity and/or an emotion associated with a linguistic content of the input audio 316A may be required to be converted after the re-training of the adversarial model 112C. In an example, the input audio 316A may be recorded via an audio recording device and sent to the electronic device 102. In another example, the input audio 316A may be pre-recorded and stored in the database 106 or the memory 204. The input audio 316A may be retrieved form the database 106 or the memory 204.

At 318, an operation of output audio determination may be executed. The third ML model 110C may be configured to convert the input audio 316A associated with the first user to the output audio 318A associated with the identity of the second user and the emotion of the third user. With reference to FIG. 3B, the output audio 318A may be associated with the identity of the second user, for example, "Mark", and further associated with the emotion "angry" of the third user, for example, "Tom". That is, the output audio 318A may include audio content of the input audio 316A but in a voice of the second user "Mark" with "angry" emotion of "Tom".

In some embodiments, the output audio 318A may correspond to a non-human voice. In an example, the input audio 316A may be a human voice associated with the first user (e.g., "John") and the output audio 318A may be an audio associated with an identity of a "dog" (which may be the second user). Further, the output audio 318A may be associated with an emotion "angry" of the third user, for example, "Mark".

In an embodiment, the input audio 316A may be a doorbell sound and the output audio 318A may be a human voice. In an example, the doorbell sound may be a sentence "please open the door". The input audio 316A may be converted to the output audio 318A that may be associated with the identity of the second user "Mark". The output audio 318A may be further associated with the emotion "angry" of the third user "Tom". That is, the output audio 318A may be a sentence "please open the door" that may appear as if spoken in an angry tone by the second user "Mark". Thus, the doorbell sound may be converted to the output audio 318A that may be the human voice.

In an embodiment, the input audio 316A may be a human voice and the output audio 318A may be a doorbell sound. In an example, the input audio 316A may include a sentence "please open the door" in a voice of a first user "Mary". The input audio 316A may be converted to the output audio 318A that may be associated with the doorbell sound.

The disclosed electronic device 102 may be used to convert a source audio into a converted audio and train the generator model (i.e., the third ML model 110C) and the discriminator model (i.e., the adversarial model 112C) using the audio. The audio may be associated with speaker-emotion pairs unseen to the discriminator model. Further, the electronic device 102 may convert a speaker identity and an emotional style associated with the source audio simultaneously via virtual domain mixing using the third ML model 110C. The electronic device 102 may employ fake pair masking to prevent application of the discriminator model on generated converted audio generated by the generator model based on a determination that a speaker identity-emotion pair associated with the converted audio is an unseen pair. The electronic device 102 may apply the annealing model 112D on a fundamental frequency loss and a norm consistency loss associated with the source audio to determine the set of weights associated with the determined fundamental frequency loss and the determined norm consistency loss. The third ML model 110C may be re-trained further based on the determined set of weights.

Figure 4:
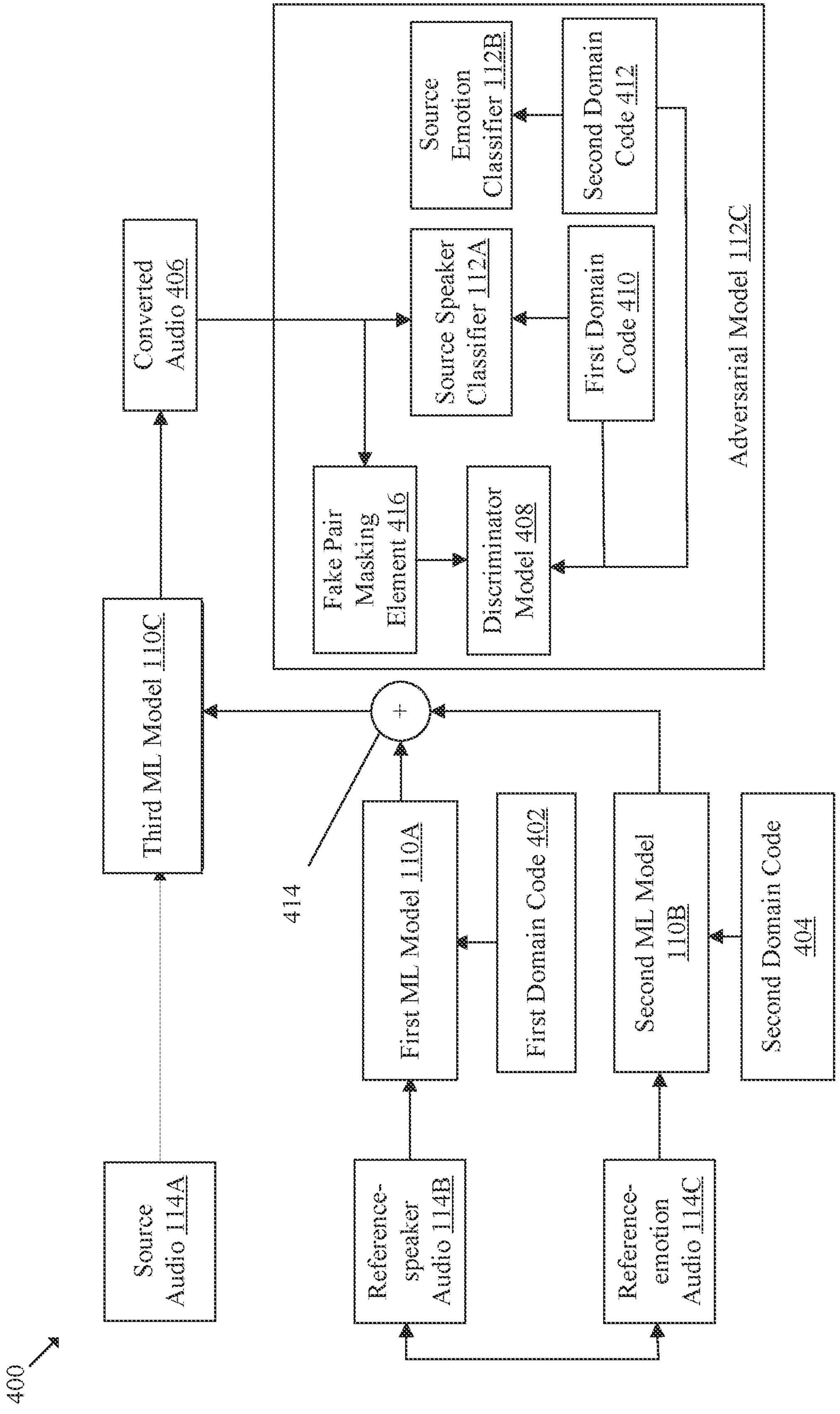
FIG. 4 is a diagram that illustrates an exemplary scenario of a ML-based emotion and voice conversion in audio using virtual domain mixing and fake pair-masking, in accordance with an embodiment of the disclosure.

FIG. 4 is a diagram that illustrates an exemplary scenario of a ML-based emotion and voice conversion in audio using virtual domain mixing and fake pair-masking, in accordance with an embodiment of the disclosure. FIG. 4 is described in conjunction with elements from FIG. 1, FIG. 2, FIG. 3A, and FIG. 3B. With reference to FIG. 4, there is shown an exemplary scenario 400. In the exemplary scenario 400, there is shown the first ML model 110A, the second ML model 110B, the third ML model 110C, the source speaker classifier 112A, the source emotion classifier 112B, the adversarial model 112C, the source audio 114A, the reference-speaker audio 114B, and the reference-emotion audio 114C, of FIG. 1. There is further shown a first domain code 402, a second domain code 404, a converted audio 406, a discriminator model 408, a first domain code 410, a second domain code 412, an adder 414, and a fake pair masking element 416. The adversarial model 112C may include the discriminator model 408, the first domain code 410, the second domain code 412, and the fake pair masking element 416. A set of operations associated with the scenario 400 is described herein.

With reference to FIG. 4, the reference-speaker audio 114B and the first domain code 402 may be provided as an input to the first ML model 110A. Based on the application of the first ML model 110A on the reference-speaker audio 114B and the first domain code 402, the speaker style code "$h_{spk}$" associated with the reference-speaker audio 114B may be determined. Further, the reference-emotion audio 114C and the second domain code 404 may be provided as an input to the second ML model 110B. Based on the application of the second ML model 110B on the reference-emotion audio 114C and the second domain code 404, the emotion style code "$h_{emo}$" associated with the reference-emotion audio 114C may be determined. Thereafter, the adder 414 may determine a summation of the speaker style code "$h_{spk}$" and the emotion style code "$h_{emo}$".

With reference to FIG. 4, the source audio 114A and the summation of the speaker style code "$h_{spk}$" and the emotion style code "$h_{emo}$" may be provided as an input to the third ML model 110C. Based on the application of the third ML model 110C, the converted audio 406 may be determined. The converted audio 406 and the first domain code 410 may be provided as inputs to the source speaker classifier 112A to classify whether an identity associated with the converted audio 406 belongs to the second user. In an embodiment, the first domain code 410 may be similar to the first domain code 402. The converted audio 406 and the second domain code 412 may be provided as inputs to the source emotion classifier 112B to classify whether an emotion associated with the converted audio 406 is an emotion of the third user. In an embodiment, the second domain code 412 may be similar to the second domain code 404.

Further, the converted audio 406 may be provided to the fake pair masking element 416. The circuitry 202 may determine whether an identity-emotion pair associated with the converted audio 406 is a seen pair for the discriminator model 408. If the identity-emotion pair is a seen pair, the fake pair masking element 416 may provide the converted audio 406 to the discriminator model 408. The discriminator model 408 may determine whether the converted audio 406 is real or fake. Based on an output of the discriminator model 408, the third ML model 110C and the discriminator model 408 may be re-trained.

On the other hand, if the identity-emotion pair associated with the converted audio 406 is an unseen pair, the fake pair masking element 416 may not provide the converted audio 406 to the discriminator model 408, and mask the identity-emotion pair.

It should be noted that scenario 400 of FIG. 4 is for exemplary purposes and should not be construed to limit the scope of the disclosure.

Figure 5:
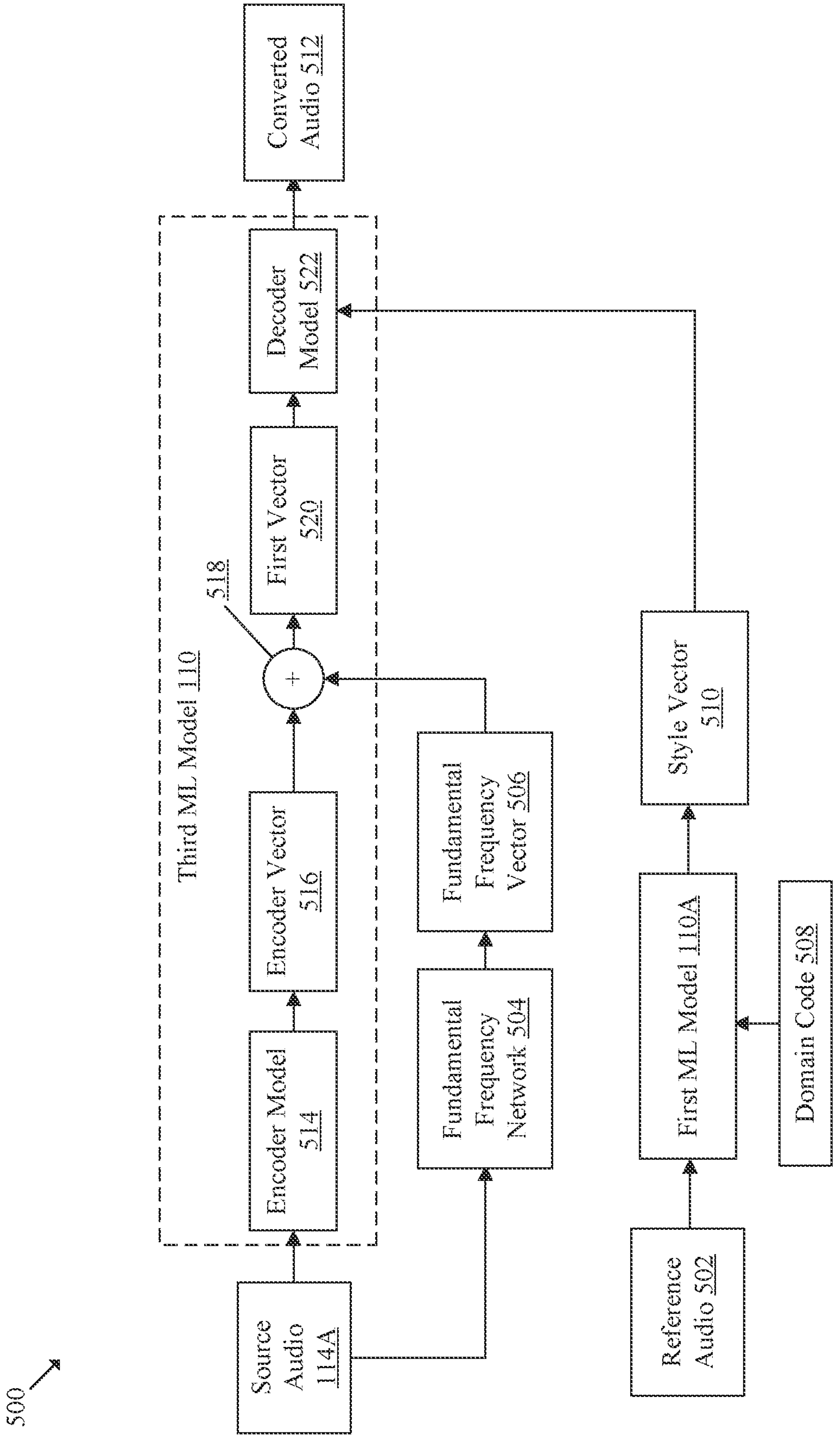
FIG. 5 is a diagram that illustrates an exemplary scenario of application of a ML model for emotion and voice conversion in audio using virtual domain mixing and fake pair-masking, in accordance with an embodiment of the disclosure.

FIG. 5 is a diagram that illustrates an exemplary scenario of application of a third ML model, in accordance with an embodiment of the disclosure, in accordance with an embodiment of the disclosure. FIG. 5 is described in conjunction with elements from FIG. 1, FIG. 2, FIG. 3A, FIG. 3B, and FIG. 4. With reference to FIG. 5, there is shown an exemplary scenario 500. In the exemplary scenario 500, there is shown the source audio 114A, the first ML model 110A, and the third ML model 110C of FIG. 1. There is further shown a reference audio 502, a fundamental frequency network 504, a fundamental frequency vector 506, a domain code 508, a style vector 510, and a converted audio 512. The third ML model 110C may include an encoder model 514, an encoded vector 516, a summer 518, a first vector 520, and a decoder model 522. A set of operations associated with the scenario 500 is described herein.

With reference to FIG. 5, the reference audio 502 and the domain code 508 may be provided as an input to the first ML model 110A. In an embodiment, the reference audio 502 may be a voice content associated with an identity and emotion (neutral or non-neutral) of the second user The reference audio 502 may correspond to a user identity and non-neutral (or neutral) emotion spectrogram associated with the second user. Based on an application of the first ML model 110A on the reference audio 502 and the domain code, the style vector 510 may be obtained. Herein, the style vector 510 may be associated with a speaker identity and an emotion of the second user.

Further, the encoder model 514 may be applied on the received source audio 114A. Based on the application of the encoder model 514, the encoded vector 516 may be determined. The source audio 114A may be also provided as an input to the fundamental frequency network 504. Based on the application of the fundamental frequency network 504 on the received source audio 114A, the fundamental frequency vector 506 may be determined. The determined encoded vector 516 and the fundamental frequency vector 506 may be provided as an input to the summer 518 to determine the first vector 520. The decoder model 522 may be applied on the determined first vector 520 and the determined style vector 510. Based on the application of the decoder model 522, the converted audio 512 may be obtained. Herein, the converted audio 512 may be associated with a linguistic content of the source audio 114A, the emotion of the second user, and the identity of the second user with the reference audio 502. The scenario 500 may be thus applicable in situations where the reference audio 502 is associated with non-neutral emotion.

It should be noted that scenario 500 of FIG. 5 is for exemplary purposes and should not be construed to limit the scope of the disclosure.

Figure 6:
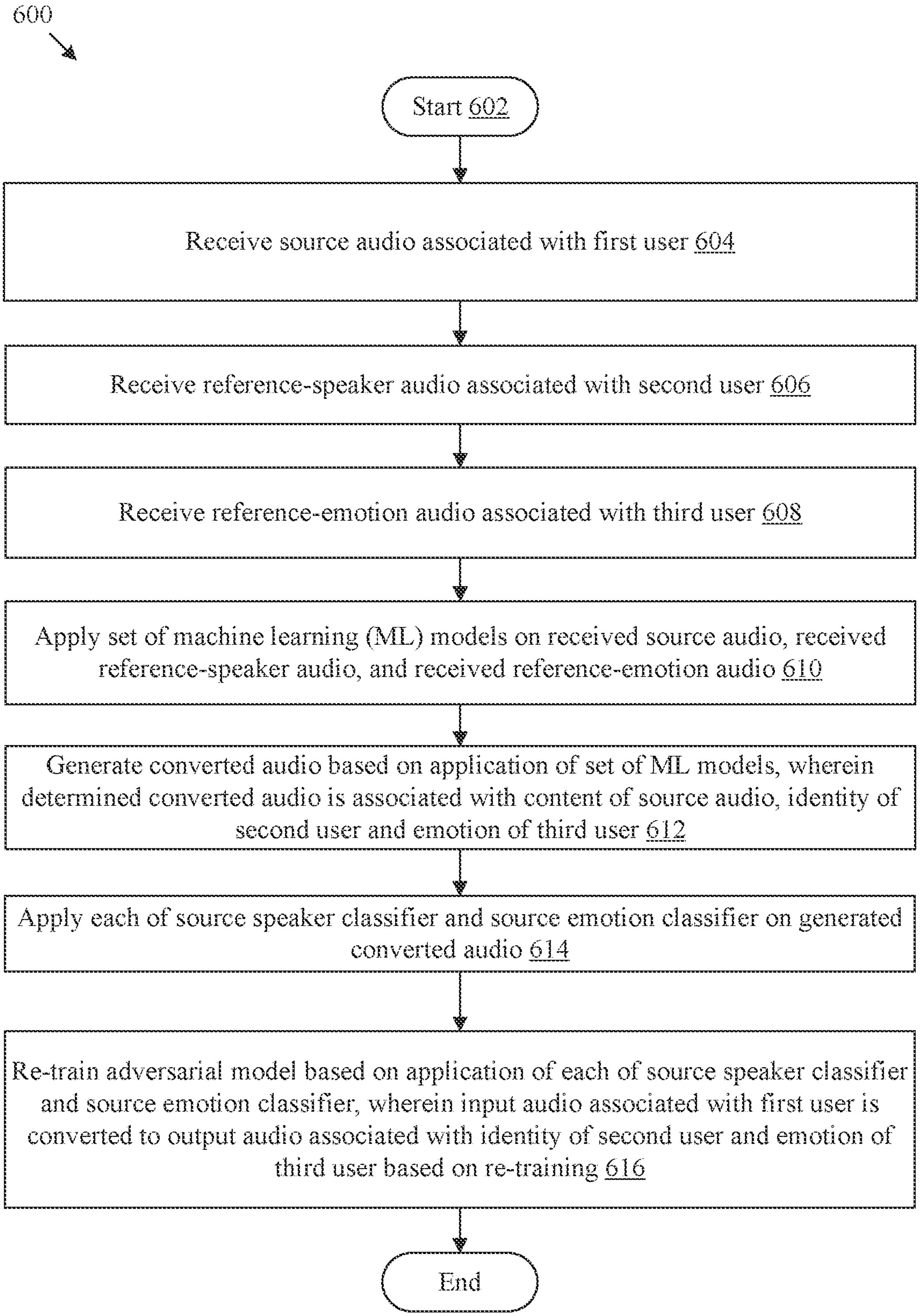
FIG. 6 is a flowchart that illustrates operations of an exemplary method for machine learning (ML) based emotion and voice conversion in audio using virtual domain mixing and fake pair-masking, in accordance with an embodiment of the disclosure.

FIG. 6 is a flowchart that illustrates operations of an exemplary method for machine learning (ML) based emotion and voice conversion in audio using virtual domain mixing and fake pair-masking, in accordance with an embodiment of the disclosure. FIG. 6 is described in conjunction with elements from FIG. 1, FIG. 2, FIG. 3A, FIG. 3B, FIG. 4, and FIG. 5. With reference to FIG. 6, there is shown a flowchart 600. The flowchart 600 may include operations from 602 to 616 and may be implemented by the electronic device 102 of FIG. 1 or by the circuitry 202 of FIG. 2. The flowchart 600 may start at 602 and proceed to 604.

At 604, the source audio 114A associated with the first user may be received. The circuitry 202 may be configured to receive the source audio 114A associated with the first user. Details related to the reception of the source audio 114A are further provided, for example, in FIG. 3A (at 302).

At 606, the reference-speaker audio 114B associated with the second user may be received. The circuitry 202 may be configured to receive the reference-speaker audio 114B associated with the second user. Details related to the reception of the reference-speaker audio 114B are further provided, for example, in FIG. 3A (at 304).

At 608, the reference-emotion audio 114C associated with the third user may be received. The circuitry 202 may be configured to receive the reference-emotion audio 114C associated with the third user. Details related to the reception of the reference-emotion audio 114C are further provided, for example, in FIG. 3A (at 306).

At 610, the set of machine learning (ML) models 110 may be applied on the received source audio 114A, the received reference-speaker audio 114B, and the received reference-emotion audio 114C. The circuitry 202 may be configured to apply the set of ML models 110 on the received source audio 114A, the received reference-speaker audio 114B, and the received reference-emotion audio 114C. Details related to the application of the set of ML models 110 are further provided, for example, in FIG. 3A (at 308).

At 612, the converted audio 310A may be generated based on the application of the set of ML models 110, wherein the generated converted audio 310A may be associated with content of the source audio, the identity of the second user and an emotion of the third user. The circuitry 202 may be configured to generate the converted audio 310A based on the application of the set of ML models 110, wherein the generated converted audio 310A may be associated with the content of the source audio, the identity of the second user, and the emotion of the third user. Details related to the generation of the converted audio are further provided, for example, in FIG. 3A (at 310).

At 614, each of the source speaker classifier 112A and the source emotion classifier 112B may be applied on the generated converted audio 310A. The circuitry 202 may be configured to apply each of the source speaker classifier 112A and the source emotion classifier 112B on the generated converted audio 310A. Details related to the application of the source speaker classifier 112A and the source emotion classifier 112B are further provided, for example, in FIG. 3B (at 312).

At 616, the adversarial model 112C may be re-trained based on the application of each of the source speaker classifier 112A and the source emotion classifier 112B, wherein an input audio 316A associated with the first user may be converted to the output audio 318A associated with the identity of the second user and the emotion of the third user based on the re-training. The circuitry 202 may be configured to re-train the adversarial model 112C based on the application of each of the source speaker classifier 112A and the source emotion classifier 112B, wherein the input audio 316A associated with the first user may be converted to the output audio 318A associated with the identity of the second user and the emotion of the third user based on the re-training. Details related to the re-training of the adversarial model 112C are further provided, for example, in FIG. 3B (at 314). Control may pass to end.

Although the flowchart 600 is illustrated as discrete operations, such as, 604, 606, 608, 610, 612, 614, and 616, the disclosure is not so limited. Accordingly, in certain embodiments, such discrete operations may be further divided into additional operations, combined into fewer operations, or eliminated, depending on the implementation without detracting from the essence of the disclosed embodiments.

Various embodiments of the disclosure may provide a non-transitory computer-readable medium and/or storage medium having stored thereon, computer-executable instructions executable by a machine and/or a computer to operate an electronic device (for example, the electronic device 102 of FIG. 1). Such instructions may cause the electronic device 102 to perform operations that may include reception of a source audio (e.g., the source audio 114A) associated with a first user. The operation may further include reception of a reference-speaker audio (e.g., the reference-speaker audio 114B) associated with a second user. The operation may further include reception of a reference-emotion audio (e.g., the reference-emotion audio 114C) associated with a third user. The operation may further include application of a set of machine learning (ML) models (e.g., the set of ML models 110) on the received source audio 114A, the received reference-speaker audio 114B, and the received reference-emotion audio 114C. The operation may further include generation of a converted audio (e.g., the converted audio 310A) based on the application of the set of ML models 110, wherein the generated converted audio 310A may be associated with content of the source audio, the identity of the second user, and an emotion of the third user. The operation may further include application of each of a source speaker classifier (e.g., the source speaker classifier 112A) and a source emotion classifier (e.g., the source emotion classifier 112B) on the generated converted audio 310A. The operation may further include re-training an adversarial model (e.g., the adversarial model 112C) based on the application of each of the source speaker classifier 112A and the source emotion classifier 112B. An input audio (e.g., the input audio 316A) associated with the first user may be converted to an output audio (e.g., the output audio 318A) associated with the identity of the second user and the emotion of the third user based on the re-training.

Exemplary aspects of the disclosure may provide an electronic device (such as, the electronic device 102 of FIG. 1) that includes circuitry (such as, the circuitry 202). The circuitry 202 may be configured to receive the source audio 114A associated with the first user. The circuitry 202 may be configured to receive the reference-speaker audio 114B associated with the second user. The circuitry 202 may be configured to receive the reference-emotion audio 114C associated with the third user. The circuitry 202 may be configured to apply the set of ML models 110 on the received source audio 114A, the received reference-speaker audio 114B, and the received reference-emotion audio 114C. The circuitry 202 may be configured to generate the converted audio 310A based on the application of the set of ML models 110, wherein the generated converted audio 310A may be associated with content of the source audio 114A, the identity of the second user, and the emotion of the third user. The circuitry 202 may be configured to apply each of the source speaker classifier 112A and the source emotion classifier 112B on the generated converted audio 310A. The circuitry 202 may be configured to re-train the adversarial model 112C based on the application of each of the source speaker classifier 112A and the source emotion classifier 112B, wherein the input audio 316A associated with the first user may be converted to the output audio 318A associated with the identity of the second user and the emotion of the third user based on the re-training.

In an embodiment, the source audio 114A may correspond to the neutral-emotion spectrogram associated with the first user, the reference-speaker audio 114B may correspond to the user identity spectrogram associated with the second user, and the reference-emotion audio 114C may correspond to the non-neutral emotion spectrogram associated with the third user.

In an embodiment, the circuitry 202 may be further configured to apply the first ML model 110A, of the set of ML models 110, on the received reference-speaker audio 114B and a first domain code (e.g., the first domain code 402) associated with the received reference-speaker audio 114B. The circuitry 202 may be further configured to determine a speaker style code associated with the received reference-speaker audio 114B based on the application of the first ML model 110A. The circuitry 202 may be further configured to apply the second ML model 110B, of the set of ML models 110, on the received reference-emotion audio 114C and a second domain code (e.g., the second domain code 404) associated with the received reference-emotion audio 114C. The circuitry 202 may be further configured to determine an emotion style code associated with the received reference-emotion audio 114C based on the application of the second ML model 110B. The circuitry 202 may be further configured to apply the third ML model 110C, of the set of ML models 110 on the received source audio 114A, the determined speaker style code, and the determined emotion style code, wherein the generation of the converted audio 310A may be further based on the application of the third ML model 110C.

In an embodiment, the first ML model 110A may be a speaker style encoder model.

In an embodiment, the second ML model 110B may be an emotion style encoder model.

In an embodiment, the third ML model 110C may correspond to a generator model.

In an embodiment, the generator model may include an encoder model (e.g., the encoder model 514), an adder model, and a decoder model (e.g., the decoder model 522).

In an embodiment, the circuitry 202 may be further configured to apply the encoder model 514 on the received source audio 114A. The circuitry 202 may be further configured to determine an encoded vector (e.g., the encoded vector 516) based on the application of the encoder model 514. The circuitry 202 may be further configured to apply a fundamental frequency network (e.g., the fundamental frequency network 504) on the received source audio 114A. The circuitry 202 may be further configured to determine a fundamental frequency (e.g., the fundamental frequency vector 506) based on the application of the fundamental frequency network 504. The circuitry 202 may be further configured to apply the adder model (for example, the summer 518 of FIG. 5) on the determined encoded vector 516 and the determined fundamental frequency vector 506. The circuitry 202 may be further configured to determine a first vector (e.g., the first vector 520) based on the application of the adder model. The circuitry 202 may be further configured to apply the decoder model 522 on the determined first vector 520, the determined speaker style code, and the determined emotion style code, wherein the generation of the converted audio 310A may be further based on the application of the decoder model 522.

In an embodiment, the adversarial model 112C may include a discriminator model (e.g., the discriminator model 408).

In an embodiment, the circuitry 202 may be further configured to apply the discriminator model 408 on the generated converted audio 406 based on the determination that the reference-speaker audio 114B and the reference-emotion audio 114C correspond to the seen pair.

In an embodiment, the circuitry 202 may be further configured to determine a fundamental frequency loss and a norm consistency loss associated with the generated converted audio 310. The circuitry 202 may be further configured to apply an annealing model (e.g., the annealing model 112D) on the determined fundamental frequency loss and the determined norm consistency loss. The circuitry 202 may be further configured to determine the set of weights associated with the determined fundamental frequency loss and the determined norm consistency loss, based on the application of the annealing model 112D, wherein the re-training of the third ML model 110C may be further based on the determined set of weights.

In an embodiment, the output audio 318A may correspond to the non-human voice.

In an embodiment, the input audio 316A may be associated with the doorbell sound and the output audio 318A may correspond to the human voice.

In an embodiment, the input audio 316A may be associated with the human voice and the output audio 318A may correspond to the doorbell sound.

The present disclosure may also be positioned in a computer program product, which comprises all the features that enable the implementation of the methods described herein, and which when loaded in a computer system is able to perform these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the embodiment disclosed, but that the present disclosure will include all embodiments that fall within the scope of the appended claims.

What is claimed is:

1. An electronic device, comprising:

circuitry configured to:

receive a source audio associated with a first user;

receive a reference-speaker audio associated with a second user;

receive a reference-emotion audio associated with a third user;

apply a set of machine learning (ML) models on the received source audio, the received reference-speaker audio, and the received reference-emotion audio;

generate a converted audio based on the application of the set of ML models, wherein the generated converted audio is associated with content of the source audio, an identity of the second user, and is further associated with an emotion corresponding to the third user;

apply each of a source speaker classifier and a source emotion classifier on the generated converted audio; and re-train an adversarial model based on the application of each of the source speaker classifier and the source emotion classifier, wherein an input audio associated with the first user is converted to an output audio associated with the identity of the second user and associated with the emotion of the third user based on the re-training.

2. The electronic device according to claim 1, wherein the circuitry is further configured to:

apply a first ML model, of the set of ML models, on the received reference-speaker audio and a first domain code associated with the received reference-speaker audio;

determine a speaker style code associated with the received reference-speaker audio based on the application of the first ML model;

apply a second ML model, of the set of ML models, on the received reference-emotion audio and a second domain code associated with the received reference-emotion audio;

determine an emotion style code associated with the received reference-emotion audio based on the application of the second ML model; and apply a third ML model, of the set of ML models on the received source audio, the determined speaker style code, and the determined emotion style code, wherein the generation of the converted audio is further based on the application of the third ML model.

3. The electronic device according to claim 2, wherein the second ML model is an emotion style encoder model.

4. The electronic device according to claim 2, wherein the third ML model corresponds to a generator model.

5. The electronic device according to claim 4, wherein the generator model includes an encoder model, an adder model, and a decoder model.

6. The electronic device according to claim 5, wherein the circuitry is further configured to:

apply the encoder model on the received source audio;

determine an encoded vector based on the application of the encoder model;

apply a fundamental frequency network on the received source audio;

determine a fundamental frequency based on the application of the fundamental frequency network;

apply the adder model on the determined encoded vector and the determined fundamental frequency;

determine a first vector based on the application of the adder model; and apply the decoder model on the determined first vector, the determined speaker style code, and the determined emotion style code, wherein the generation of the converted audio is further based on the application of the decoder model.

7. The electronic device according to claim 2, wherein the first ML model is a speaker style encoder model.

8. The electronic device according to claim 1, wherein the source audio corresponds to a neutral-emotion source spectrogram associated with the first user, the reference-speaker audio corresponds to a neutral-emotion user identity spectrogram associated with the second user, and the reference-emotion audio corresponds to a non-neutral emotion spectrogram associated with the third user.

9. The electronic device according to claim 1, wherein the adversarial model includes a discriminator model.

10. The electronic device according to claim 9, wherein the circuitry is further configured to apply the discriminator model on the generated converted audio based on a determination that the reference-speaker audio and the reference-emotion audio correspond to a seen pair.

11. The electronic device according to claim 2, wherein the circuitry is further configured to:

determine a fundamental frequency loss and a norm consistency loss associated with the generated converted audio;

apply an annealing model on the determined fundamental frequency loss and the determined norm consistency loss;

determine a set of weights associated with the determined fundamental frequency loss and the determined norm consistency loss, based on the application of the annealing model; and re-train the third ML model based on the determined set of weights.

12. The electronic device according to claim 1, wherein the output audio corresponds to a non-human voice.

13. The electronic device according to claim 1, wherein the input audio is associated with a doorbell sound and the output audio corresponds to a human voice.

14. The electronic device according to claim 1, wherein the input audio is associated with a human voice and the output audio corresponds to a doorbell sound.

15. A method, comprising:

in an electronic device:

receiving a source audio associated with a first user;

receiving a reference-speaker audio associated with a second user;

receiving a reference-emotion audio associated with a third user;

applying a set of machine learning (ML) models on the received source audio, the received reference-speaker audio, and the received reference-emotion audio;

generating a converted audio based on the application of the set of ML models, wherein the generated converted audio is associated with content of the source audio, an identity of the second user and is further associated with an emotion corresponding to the third user;

applying each of a source speaker classifier and a source emotion classifier on the generated converted audio; and re-training an adversarial model based on the application of each of the source speaker classifier and the source emotion classifier, wherein an input audio associated with the first user is converted to an output audio associated with the identity of the second user and associated with the emotion of the third user based on the re-training.

16. The method according to claim 15, further comprising:

applying a first ML model, of the set of ML models, on the received reference-speaker audio and a first domain code associated with the received reference-speaker audio;

determining a speaker style code associated with the received reference-speaker audio based on the application of the first ML model;

applying a second ML model, of the set of ML models, on the received reference-emotion audio and a second domain code associated with the received reference-emotion audio;

determining an emotion style code associated with the received reference-emotion audio based on the application of the second ML model; and applying a third ML model, of the set of ML models on the received source audio, the determined speaker style code, and the determined emotion style code, wherein the generation of the converted audio is further based on the application of the third ML model.

17. The method according to claim 16, wherein the first ML model is a speaker style encoder model.

18. The method according to claim 16, wherein the second ML model is an emotion style encoder model.

19. The method according to claim 15, wherein the source audio corresponds to a neutral-emotion source spectrogram associated with the first user, the reference-speaker audio corresponds to a neutral-emotion user identity spectrogram associated with the second user, and the reference-emotion audio corresponds to a non-neutral emotion spectrogram associated with the third user.

20. A non-transitory computer-readable medium having stored thereon, computer-executable instructions that when executed by an electronic device, causes the electronic device to execute operations, the operations comprising:

receiving a source audio associated with a first user;

receiving a reference-speaker audio associated with a second user;

receiving a reference-emotion audio associated with a third user;

applying a set of machine learning (ML) models on the received source audio, the received reference-speaker audio, and the received reference-emotion audio;

generating a converted audio based on the application of the set of ML models, wherein the generated converted audio is associated with content of the source audio, an identity of the second user and is further associated with an emotion corresponding to the third user;

applying each of a source speaker classifier and a source emotion classifier on the generated converted audio; and re-training an adversarial model based on the application of each of the source speaker classifier and the source emotion classifier, wherein an input audio associated with the first user is converted to an output audio associated with the identity of the second user and associated with the emotion of the third user based on the re-training.

* * * * *